United States Patent [19]

Muir

[11] Patent Number: 4,548,718

[45] Date of Patent: Oct. 22, 1985

[54] TREATING CYANIDE-CONTAINING EFFLUENTS

[75] Inventor: Colin W. A. Muir, Sandton, South Africa

[73] Assignee: Johannesburg Consolidated Investment Company Limited, Transvaal, South Africa

[21] Appl. No.: 535,569

[22] Filed: Sep. 26, 1983

[30] Foreign Application Priority Data

Oct. 13, 1982 [ZA] South Africa ...................... 82/7482

[51] Int. Cl.[4] .............................. C02F 1/52; C02F 1/70
[52] U.S. Cl. ..................................... 210/719; 210/713; 210/724; 210/737; 210/904; 210/912; 423/366
[58] Field of Search ............... 210/716, 717, 719, 721, 210/723, 737, 904, 912, 913, 757, 758, 713, 724; 423/366, 367

[56] References Cited

U.S. PATENT DOCUMENTS

| | | | |
|---|---|---|---|
| 2,194,438 | 3/1940 | Wernlund et al. | 210/737 |
| 3,235,489 | 2/1966 | Bell et al. | 210/778 |
| 3,931,007 | 1/1976 | Sugano et al. | 210/721 |
| 4,250,030 | 2/1981 | Kuit et al. | 210/904 |

FOREIGN PATENT DOCUMENTS

| | | | |
|---|---|---|---|
| 2307669 | 8/1974 | Fed. Rep. of Germany | 210/904 |
| 2341228 | 2/1975 | Fed. Rep. of Germany | 210/904 |
| 49-24420 | 6/1974 | Japan | 210/904 |
| 50-656 | 1/1975 | Japan | 210/904 |
| 51-108672 | 9/1976 | Japan | 210/778 |

*Primary Examiner*—Peter Hruskoci
*Attorney, Agent, or Firm*—Kuhn, Muller and Bazerman

[57] ABSTRACT

Effluents from cyanidation operations are treated by contacting the effluent with powdered sulphur and iron to reduce the base metal content and cyanide ion content of the effluents.

2 Claims, No Drawings

TREATING CYANIDE-CONTAINING EFFLUENTS

BACKGROUND OF THE INVENTION

This invention relates to the treatment of cyanide-containing effluents.

Waste effluents from some industrial processes contain high levels of cyanide either as a free ion or complexed with base metals. Before being discharged into the environment, such an effluent requires treatment to remove the cyanide and many of the base metals from solution.

Known treatment processes use relatively expensive reagents and may also produce toxic cyanogen compounds.

The present invention is based on an unexpected result obtained by the inventors.

SUMMARY OF THE INVENTION

According to the invention an effluent containing metal cyanide complexes and free cyanide is treated by contacting the effluent with powdered sulphur and metallic iron, e.g. in the form of iron filings, at an elevated temperature, preferably between 50° C. and boiling point.

In a practical application the sulphur and iron filings were stirred into the effluent, but it is expected that other forms of mixing will also be effective.

As yet the optimal additions of sulphur and elemental iron have not been determined, but when the sulphur was less than half by mass of the iron, good results were achieved.

DESCRIPTION OF EXAMPLES

Different effluents containing base metal complexes and free cyanide as well as antimony and arsenic complexes were stirred with powdered sulphur and iron filings together with a filter aid. Five grams of sulphur, 11.5 g of iron filings and 5 g of filter aid were used with each 500 ml of effluent. The effluent was stirred for four hours in the case of test 1 and 24 hours in the case of the other tests at a temperature of 80° C. and a final pH of 8.

The slurry was filtered and the following results were obtained:

TEST 1.

|  | Cu mg/l | Ni mg/l | Fe mg/l | Co mg/l | As mg/l | Sb mg/l | $CN^-$ mg/l |
|---|---|---|---|---|---|---|---|
| Assay of original solution | 28.9 | 48.1 | 1.5 | 3.15 | 7.9 | 153 | N.A. |
| Assay of filtrate | 0.04 | 3.6 | 1.8 | 0.91 | 0.92 | 0.41 | <0.1 |

N.A. = not available.

TEST 2.

|  | Cu mg/l | Ni mg/l | Fe mg/l | Sb mg/l | As mg/l |
|---|---|---|---|---|---|
| Assay of original solution | 183 | 326 | 75 | 36.1 | 77.3 |
| Assay of filtrate | 0.28 | 1.1 | 85 | <0.1 | <1 |

TEST 3.

|  | Cu mg/l | Ni mg/l | Co mg/l | Fe mg/l | As mg/l | Sb mg/l | $CN^-$ mg/l |
|---|---|---|---|---|---|---|---|
| Original | 1200 | 209 | 293 | 50 | 12.8 | 130 | 1031 |
| Filtrate | 0.52 | 1.1 | 1.4 | 66 | <1 | <1 | 59 |

The results show that the procedure of the invention provides a method for decreasing to a very significant extent the concentration of base metals, that are found after cyanidation.

TEST 4.

In large scale operation it is practical to use scrap iron rather than iron powder. It is then necessary to ensure that the surfaces are clean and not oxidized, and after degreasing, a wash with dilute hydrochloric acid is necessary. It is also essential that the iron be made active by conditioning with the other constituents, namely finely powdered sulphur and effluent solution at the required temperature.

Once the surface of scrap iron has been conditioned, the reagents comprising unreacted scrap, sulphur and kieselguhr, together with the precipitate that is formed, may be used to initiate reaction in further sequences of effluent treatment, as the data in the tables below show.

|  | Au mg/l | Cu mg/l | Ni mg/l | Fe mg/l | As mg/l | Sb mg/l | $CN^-$ mg/l |
|---|---|---|---|---|---|---|---|
| Original Solution assay | 23.7 | 124 | 121 | 195 | 4.0 | 11.4 | 458 |

After treatment of 500 ml with 20 g of cleaned iron shavings and 5 g of powdered S with 1 g of kieselguhr as a collector for 24 hours at 80° C.:

|  | Au mg/l | Cu mg/l | Ni mg/l | Fe mg/l | As mg/l | Sb mg/l | FREE $CN^-$ mg/l |
|---|---|---|---|---|---|---|---|
| Solution assay | 0.01 | 0.06 | 5.6 | 0.33 | NIL | 0.3 | 33 |

After treatment of a further 500 ml with the recycled solids from the previous test for 24 hours at 80° C., the solution assay was as follows:

|  | Au mg/l | Cu mg/l | Ni mg/l | Fe mg/l | As mg/l | Sb mg/l | FREE CN mg/l |
|---|---|---|---|---|---|---|---|
|  | 0.01 | 0.95 | 0.5 | 0.15 | NIL | 3.1 | 50 |

The recycled solids were then used again to treat 500 ml of a more concentrated effluent with the following assay:

|  | Au mg/l | Cu mg/l | Ni mg/l | Fe mg/l | As mg/l | Sb mg/l | CN' mg/l |
|---|---|---|---|---|---|---|---|
| Effluent assay | 16.6 | 286 | 110 | 17.7 | 9.9 | 25.7 | 2352 |

With the following result after 24 hours at 80° C.:

|  | Au mg/l | Cu mg/l | Ni mg/l | Fe mg/l | As mg/l | Sb mg/l | CN' mg/l |
| --- | --- | --- | --- | --- | --- | --- | --- |
| Treated effluent | 3.8 | 0.27 | 7.7 | 5.53 | NIL | 0.32 | 37.5 |

TEST 5.

The sequence was repeated in test 5 using iron filings collected from a grinding wheel in a workshop. The material which obviously contained some corundum, was cleaned in the same manner as in test 4. The same effluents were used, with the same operating parameters. The results are given below.

Original effluent assay—as in test 4.

|  | Au mg/l | Cu mg/l | Ni mg/l | Fe mg/l | As mg/l | Sb mg/l | CN mg/l |
| --- | --- | --- | --- | --- | --- | --- | --- |
| Assay of treated solution | 0.01 | 0.06 | 0.9 | 0.18 | NIL | 1.0 | 32 |
| Assay after recycle of solids | 0.01 | 0.02 | 0.3 | 1.48 | NIL | N.A | 38 |

N.A = Not available.

Concentrated effluent assay—as in test 4.

|  | Au mg/l | Cu mg/l | Ni mg/l | Fe mg/l | As mg/l | Sb mg/l | CN mg/l |
| --- | --- | --- | --- | --- | --- | --- | --- |
| Assay after 2nd cycle of solids | 3.59 | 0.3 | 1.0 | 0.2 | NIL | 0.3 | 32 |

These results indicate that it is possible to treat concentrated cyanide effluent in one or more agitated tanks in a continuous mode of operation. With the provision of an efficient heat exchange system, the solution leaving the system will be used to heat incoming effluent.

It is also believed that denser scrap iron could be used after suitable conditioning, thus ensuring that the reagent requirements for the process would be inexpensive.

I claim:

1. A method of treating an effluent containing metal cyanide complexes and free cyanide to reduce the metal and cyanide content thereof including the steps of contacting the effluent with at least about 5 grams of powdered sulphur and at least about 11.5 grams of metallic iron for each 500 ml of effluent, at a pH of at least 8 and at a temperature of between 50° C. and the boiling point of the effluent, and filtering of the effluent to reduce the metal and cyanide content thereof.

2. The method claimed in claim 1 in which the sulphur is less than half by mass of the iron.

* * * * *